US010367822B2

(12) United States Patent
Buckley et al.

(10) Patent No.: US 10,367,822 B2
(45) Date of Patent: *Jul. 30, 2019

(54) RESTRICTIVE ACCESS CONTROL FOR MODULAR REFLECTION

(71) Applicant: Oracle International Corporation, Redwood Shores, CA (US)

(72) Inventors: Alexander R. Buckley, Cupertino, CA (US); Mark B. Reinhold, Menlo Park, CA (US); Alan Bateman, Dublin (IE); Paul Sandoz, Le Versoud (FR); Chris Hegarty, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,670

(22) Filed: Aug. 23, 2018

(65) Prior Publication Data

US 2019/0028483 A1 Jan. 24, 2019

Related U.S. Application Data

(63) Continuation of application No. 14/847,800, filed on Sep. 8, 2015, now Pat. No. 10,104,090.

(Continued)

(51) Int. Cl.
*G06F 21/62* (2013.01)
*H04L 29/06* (2006.01)
(Continued)

(52) U.S. Cl.
CPC ............ *H04L 63/105* (2013.01); *G06F 8/315* (2013.01); *G06F 9/4488* (2018.02);
(Continued)

(58) Field of Classification Search
CPC ... H04L 63/105; G06F 21/6218; G06F 21/629
See application file for complete search history.

(56) References Cited

U.S. PATENT DOCUMENTS 6,381,734 B1 4/2002 Golde et al.
6,883,163 B1 4/2005 Schwabe
(Continued)

OTHER PUBLICATIONS

Trance, MacPhail, "Code Generation using Annotation Processors in the Java language—part 2: Annotation Processors", Available online at <https://deors.wordpress.com/2011/10/08/annotation-processors/>, Oct. 8, 2011, 14 pages.

(Continued)

*Primary Examiner* — Joseph P Hirl
*Assistant Examiner* — Stephen T Gundry
(74) *Attorney, Agent, or Firm* — Invoke

(57) ABSTRACT

Access to a module element within a first module by a second module is prohibited if the module element within the first module has not been exposed to the second module. If a particular module element within a first module has been exposed to a second module, then access to the particular module element by the second module may or may not be allowed depending on: (a) whether the particular module element has been declared with a public or non-public access modifier, (b) whether a second exposed module element, which includes the particular module element, has been declared with a public or non-public access modifier, (c) a level of access associated with the operation that attempts to access the particular module element of the first module, and/or (d) whether an accessibility override configuration is set for accessing the particular module element.

22 Claims, 6 Drawing Sheets

Related U.S. Application Data

(60) Provisional application No. 62/209,878, filed on Aug. 25, 2015.

(51) Int. Cl.
*G06F 9/448* (2018.01)
*G06F 8/30* (2018.01)
*G06F 9/445* (2018.01)

(52) U.S. Cl.
CPC ........ *G06F 9/44521* (2013.01); *G06F 21/629* (2013.01); *G06F 21/6218* (2013.01)

(56) References Cited

U.S. PATENT DOCUMENTS

| | | | |
|---|---|---|---|
| 6,951,022 B1 | 9/2005 | Golde et al. | |
| 6,981,245 B1 | 12/2005 | Schwabe | |
| 6,983,460 B1 | 1/2006 | Goire et al. | |
| 6,986,132 B1 | 1/2006 | Schwabe | |
| 7,032,216 B1 | 4/2006 | Nizhegorodov | |
| 7,051,323 B2 | 5/2006 | Lam et al. | |
| 7,228,532 B1 | 6/2007 | Shaylor et al. | |
| 7,243,306 B1 | 7/2007 | Joshi et al. | |
| 7,320,123 B2 | 1/2008 | Govindarajapuram et al. | |
| 7,360,206 B1 | 4/2008 | Hatcher | |
| 7,406,687 B1 | 7/2008 | Daynes et al. | |
| 7,434,202 B2 | 10/2008 | Kramer | |
| 7,487,507 B1 | 2/2009 | Lun et al. | |
| 7,503,031 B2 | 3/2009 | Chang et al. | |
| 7,565,364 B1 | 7/2009 | Darcy et al. | |
| 7,644,402 B1 | 1/2010 | Daynes et al. | |
| 7,650,600 B2 * | 1/2010 | King | G06F 8/43 717/148 |
| 7,669,184 B2 * | 2/2010 | Bracha | G06F 9/4488 717/116 |
| 7,752,599 B2 | 7/2010 | Takacsi-Nagy et al. | |
| 7,840,939 B1 | 11/2010 | Chinnici | |
| 7,895,445 B1 | 2/2011 | Albanese et al. | |
| 7,913,265 B2 * | 3/2011 | Grimaud | G06F 9/44557 717/148 |
| 7,966,602 B1 | 6/2011 | Webster et al. | |
| 8,037,467 B2 * | 10/2011 | Bandaram | G06F 9/44547 717/166 |
| 8,082,542 B2 | 12/2011 | Bottomley et al. | |
| 8,141,035 B2 * | 3/2012 | Kinder | G06F 8/315 717/108 |
| 8,214,811 B2 * | 7/2012 | Barcia | G06F 9/4492 717/148 |
| 8,250,559 B2 | 8/2012 | Daynes et al. | |
| 8,261,297 B2 * | 9/2012 | Kabanov | G06F 9/449 719/332 |
| 8,291,375 B2 * | 10/2012 | Ireland | G06F 9/4488 717/107 |
| 8,307,352 B2 | 11/2012 | Mausolf et al. | |
| 8,347,266 B2 * | 1/2013 | Meijer | G06F 8/437 717/116 |
| 8,352,925 B2 | 1/2013 | Russell et al. | |
| 8,429,623 B2 * | 4/2013 | Russell | G06F 9/45516 717/127 |
| 8,447,975 B2 * | 5/2013 | Botzum | G06F 21/52 713/166 |
| 8,584,104 B2 | 11/2013 | Gibbons et al. | |
| 8,627,303 B2 * | 1/2014 | Adams, III | G06F 8/4434 717/159 |
| 8,650,537 B2 * | 2/2014 | Lebert | G06F 8/443 717/108 |
| 8,683,453 B2 * | 3/2014 | Patel | G06F 9/44521 717/139 |
| 8,707,287 B2 * | 4/2014 | Raundahl Gregersen | G06F 8/656 717/168 |
| 8,875,161 B2 * | 10/2014 | Foti | G06F 8/315 719/320 |
| 9,047,097 B2 * | 6/2015 | Cabillic | G06F 9/547 |
| 9,069,568 B2 | 6/2015 | Schmidt et al. | |
| 9,069,582 B2 | 6/2015 | Mausolf et al. | |
| 9,098,715 B1 | 8/2015 | Spear et al. | |
| 9,116,707 B2 | 8/2015 | Reinhold et al. | |
| 9,128,789 B1 | 9/2015 | Zorzella et al. | |
| 9,286,085 B2 * | 3/2016 | Stoodley | G06F 9/44578 |
| 9,292,315 B1 | 3/2016 | Dawson et al. | |
| 9,298,448 B2 | 3/2016 | Eli et al. | |
| 9,323,501 B1 | 4/2016 | Ielceanu et al. | |
| 9,336,018 B2 | 5/2016 | Zhou et al. | |
| 9,361,070 B1 | 6/2016 | Nuss | |
| 9,448,873 B2 | 9/2016 | Huang et al. | |
| 9,489,214 B2 | 11/2016 | Cobb | |
| 9,529,981 B2 * | 12/2016 | Foti | G06F 8/315 |
| 9,656,171 B2 | 5/2017 | Itsuno | |
| 9,977,654 B2 | 5/2018 | Coslovi et al. | |
| 2002/0120717 A1 | 8/2002 | Giotta | |
| 2003/0009747 A1 | 1/2003 | Duran | |
| 2003/0041167 A1 | 2/2003 | French et al. | |
| 2003/0041238 A1 | 2/2003 | French et al. | |
| 2003/0101381 A1 | 5/2003 | Mateev et al. | |
| 2003/0191864 A1 | 10/2003 | Govindarajapuram et al. | |
| 2004/0003079 A1 | 1/2004 | Aiu et al. | |
| 2004/0181471 A1 | 9/2004 | Rogers | |
| 2004/0237064 A1 | 11/2004 | Liu et al. | |
| 2005/0050528 A1 | 3/2005 | Wang | |
| 2005/0055681 A1 | 3/2005 | Gadre | |
| 2005/0055682 A1 | 3/2005 | Gadre et al. | |
| 2005/0193137 A1 | 9/2005 | Farnham | |
| 2005/0198624 A1 | 9/2005 | Chipman | |
| 2005/0216885 A1 | 9/2005 | Ireland | |
| 2006/0026126 A1 | 2/2006 | Cabillic | |
| 2006/0074989 A1 | 4/2006 | Laborczfalvi et al. | |
| 2006/0101092 A1 | 5/2006 | Ishida et al. | |
| 2006/0190935 A1 | 8/2006 | Kielstra et al. | |
| 2006/0265760 A1 | 11/2006 | Daemke et al. | |
| 2006/0277456 A1 | 12/2006 | Biberstein et al. | |
| 2006/0277523 A1 | 12/2006 | Horen et al. | |
| 2006/0288353 A1 | 12/2006 | King et al. | |
| 2007/0006141 A1 | 1/2007 | Bracha et al. | |
| 2007/0011451 A1 | 1/2007 | Botzum et al. | |
| 2007/0011723 A1 | 1/2007 | Chao | |
| 2007/0027907 A1 | 2/2007 | Kulkarni et al. | |
| 2007/0061456 A1 | 3/2007 | Waris | |
| 2007/0192380 A1 | 8/2007 | Tabellion et al. | |
| 2007/0192830 A1 | 8/2007 | O'Connor | |
| 2007/0288280 A1 | 12/2007 | Gilbert et al. | |
| 2008/0010649 A1 | 1/2008 | Grimaud et al. | |
| 2008/0022260 A1 | 1/2008 | Kinder et al. | |
| 2008/0091792 A1 | 4/2008 | Mei et al. | |
| 2008/0127070 A1 * | 5/2008 | Barcia | G06F 9/4492 717/116 |
| 2008/0134154 A1 * | 6/2008 | Patel | G06F 9/44521 717/139 |
| 2008/0134207 A1 | 6/2008 | Chamieh et al. | |
| 2008/0172656 A1 * | 7/2008 | Russell | G06F 8/76 717/136 |
| 2008/0172658 A1 | 7/2008 | Russell et al. | |
| 2008/0276231 A1 | 11/2008 | Huang et al. | |
| 2008/0282266 A1 * | 11/2008 | Kabanov | G06F 9/449 719/320 |
| 2009/0070792 A1 | 3/2009 | Cable | |
| 2009/0100404 A1 | 4/2009 | Chaturvedi et al. | |
| 2009/0113406 A1 | 4/2009 | Bandaram et al. | |
| 2009/0133001 A1 | 5/2009 | Rozenfeld | |
| 2009/0150864 A1 | 6/2009 | Meijer et al. | |
| 2009/0164760 A1 | 6/2009 | Sterbenz | |
| 2009/0249311 A1 | 10/2009 | Dandamudi et al. | |
| 2009/0319554 A1 | 12/2009 | Krishnaswamy et al. | |
| 2010/0083004 A1 | 4/2010 | Kirshenbaum | |
| 2010/0138820 A1 | 6/2010 | Joshi | |
| 2011/0029960 A1 | 2/2011 | Cimadamore et al. | |
| 2011/0131561 A1 | 6/2011 | Adams et al. | |
| 2011/0145278 A1 | 6/2011 | Maes | |
| 2011/0239184 A1 | 9/2011 | Feigen | |
| 2011/0271251 A1 | 11/2011 | Buckley et al. | |
| 2011/0271254 A1 | 11/2011 | Reinhold et al. | |
| 2011/0283256 A1 | 11/2011 | Raundahl et al. | |

(56) References Cited

U.S. PATENT DOCUMENTS

| | | |
|---|---|---|
| 2011/0302565 A1 | 12/2011 | Ferris et al. |
| 2011/0321019 A1 | 12/2011 | Gibbons et al. |
| 2012/0005660 A1 | 1/2012 | Goetz et al. |
| 2012/0036462 A1 | 2/2012 | Schwartz et al. |
| 2012/0096433 A1 | 4/2012 | Reinhold et al. |
| 2012/0117538 A1 | 5/2012 | Buckley |
| 2012/0151505 A1 | 6/2012 | Verissimo De Oliveira |
| 2012/0210308 A1 | 8/2012 | Goetz et al. |
| 2012/0210320 A1 | 8/2012 | Goetz et al. |
| 2012/0272214 A1 | 10/2012 | Goetz et al. |
| 2012/0278797 A1 | 11/2012 | Secrist et al. |
| 2012/0311531 A1 | 12/2012 | Lebert |
| 2012/0317589 A1 | 12/2012 | Foti |
| 2013/0007706 A1 | 1/2013 | Burckart et al. |
| 2013/0125202 A1 | 5/2013 | Sprague et al. |
| 2013/0232469 A1 | 9/2013 | Agarwal |
| 2013/0339926 A1 | 12/2013 | Raundahl et al. |
| 2014/0089907 A1 | 3/2014 | Cabillic et al. |
| 2014/0130020 A1 | 5/2014 | Boshernitsan et al. |
| 2014/0137075 A1 | 5/2014 | Said et al. |
| 2014/0173574 A1 | 6/2014 | Schmidt et al. |
| 2014/0189672 A1* | 7/2014 | Raundahl Gregersen .................. G06F 8/656 717/168 |
| 2014/0237176 A1 | 8/2014 | Takefman et al. |
| 2014/0245275 A1 | 8/2014 | Elias et al. |
| 2014/0282441 A1 | 9/2014 | Hoban et al. |
| 2014/0351802 A1 | 11/2014 | Elias et al. |
| 2014/0358972 A1 | 12/2014 | Guarrieri et al. |
| 2015/0026703 A1 | 1/2015 | Foti |
| 2015/0089478 A1 | 3/2015 | Cheluvaraju et al. |
| 2015/0113172 A1 | 4/2015 | Johnson et al. |
| 2015/0186129 A1 | 7/2015 | Apte et al. |
| 2015/0331681 A1 | 11/2015 | Rose et al. |
| 2015/0363174 A1 | 12/2015 | Rose et al. |
| 2015/0378752 A1 | 12/2015 | Stoodley |
| 2016/0011982 A1* | 1/2016 | Sandoz ................. G06F 3/0622 712/208 |
| 2016/0011992 A1 | 1/2016 | Sandoz et al. |
| 2016/0055014 A1 | 2/2016 | Gallimore et al. |
| 2016/0055344 A1 | 2/2016 | Peterson et al. |
| 2016/0062878 A1 | 3/2016 | Westrelin et al. |
| 2016/0087933 A1 | 3/2016 | Johnson et al. |
| 2016/0098346 A1 | 4/2016 | Pechanec et al. |
| 2016/0148013 A1 | 5/2016 | Taldo et al. |
| 2016/0154658 A1* | 6/2016 | Stoodley ............. G06F 9/44578 717/166 |
| 2016/0210445 A1 | 7/2016 | Deaver |
| 2016/0232017 A1 | 8/2016 | Raundahl Gregersen |
| 2016/0344745 A1 | 11/2016 | Johnson et al. |
| 2016/0357586 A1 | 12/2016 | Rose |
| 2017/0024188 A1 | 1/2017 | Buckley et al. |
| 2017/0024196 A1 | 1/2017 | Buckley et al. |
| 2017/0039043 A1 | 2/2017 | Haupt et al. |
| 2017/0063874 A1 | 3/2017 | Buckley et al. |
| 2017/0068520 A1 | 3/2017 | Buckley et al. |
| 2017/0269929 A1 | 9/2017 | Hegarty et al. |
| 2017/0272316 A1 | 9/2017 | Johnson et al. |

OTHER PUBLICATIONS

Stack Overflow, "What's the difference between 'package' and 'module'" (last accessed on Dec. 6, 2016).
Rossberg et al., "Mixin Up the ML Module System", ACM Transactions on Programming Languages and Systems, vol. 35, No. 1, Article 2, Apr. 2013, pp. 2:1-2:84.
Reis et al., "A Module System for C++", Modules SG, Document No. N4047, May 27, 2014, pp. 1-22.
Oracle, "The Java (Trademark) Tutorials", Java Documentation, Available online at <https://docs.oracle.com/javase/tutorial/ java/annotations/basics.html>, Copyright 1995, 2015, 2 pages.
Oracle, "Interface Iterable<T>", Java Platform Standard Ed. 8, Available online at <http://docs.oracle.eom/javase/8/docs/api/java/lang/Iterable.html>, Copyright 1993, 2016, 3 pages.
Oracle, "Getting Started with the Annotation Processing Tool (apt)", Java, Available online at <http://docs.oracle.com/javase/1.5.0/docs/guide/apt/GettingStarted.html#AnnotationProcessor>, Copyright 2004, 2010, 8 pages.
Oracle and/or its Affiliate, Available online at <https://blogs.oracle.com/darcy/resource/ProjectCoin/CloseableFinder.java>, Copyright 2016, 3 pages.
NetBeans, "What is a module" (last accessed on Dec. 6, 2016).
Morling, Gunnar, "[Jigsaw] Getting "Bad Service Configuration File" Error with Annotation Processor", Available online at <http://mail.openjdk.java.net/pipermail/compiler-dev/2016-February/009985.html>, Feb. 9, 2016, 1 page.
McManus et al., "Plugging into the Java Compiler", JavaOne, 2014, 58 pages.
Hidalgo, Jorge, "JavaOne 2014—CON2013—Code Generation in the Java Compiler: Annotation Processors Do the Hard Work", Available online at <http://www.slideshare.net/deors/javaone-2014-con2013-code-generation-in-the-java-compiler-annotation-processors-do-the-hard-work>, Oct. 1, 2014, 11 pages.
Github, "jboss-logging", Available online at <https://github.eom/jboss-logging/jboss-logging-tools/blob/2.0.1.Final/processor/src/main/java/org/jboss/logging/ processor/apl/LoggingToolsProcessor.java>, Copyright 2016, 3 pages.
Github, "Dagger 2", Google, Available online at <https://github.com/google/dagger/>, Copyright 2012, 3 pages.
Github, "Dagger 1", Square, Available online at <https://github.com/square/dagger>, Copyright 2012, 2 pages.
Faycal et al., "An Agent Based Encapsulator System for Integrating and Composing Legacy System Functionalities", Proceedings of the 2015 IEEE/ WIC / ACM International Conference on Web Intelligence and Intelligent Agent Technology (WI-IAT), vol. 1, Dec. 6-9, 2015, pp. 84-87.
Darcy, Joseph D., "Properties via Annotation Processing", Oracle Weblog, Java, Available online at <https://blogs.oracle.com/darcy/entry/properties_via_annotationjDrocessing>, Sep. 2, 2009, 6 pages.
Darcy, Joseph D., "Project Coin: Bringing it to a Close(able)", Oracle Weblog, Java, Available online at< https://blogs.oracle.com/darcy/enlry/project_coin_bring_close>, Jul. 6, 2010, 5 pages.
Darcy, Joseph D., "JSR 269 Maintenance Review for Java SE 8", Oracle Weblog, Java, Available online at <https://blogs.oracle.com/darcy/tags/annotationprocessing>, Dec. 8, 2013, 9 pages.
Buckley, Alex, "Project Jigsaw: Under the Hood", Java Platform Group, Oracle, Oct. 2015, 62 pages.
Breslav, Andrey, "kapt: Annotation Processing for Kotlin", Kotlin Blog, Available online at <http://blog.jetbrains.com/kotlin/2015/05/kapt-annotation-processing-for-kotlin/>, May 21, 2015, 8 pages.
Breslav, Andrey, "Better Annotation Processing: Supporting Stubs in kapt", Kellin Blog, Available online at <http://blog.jetbrains.com/kotlin/2015/06/betler-annotation-processing-supporting-stubs-in-kapt/>, Jun. 22, 2015, 6 pages.
Bracha et al., "Mirrors: Design Principles for Meta-level Facilities of Object-Oriented Programming Languages", OOPSLA '04 Proceedings of the 19th annual ACM SIGPLAN conference on Object-oriented programming, systems, Languages, and applications, Oct. 24-28, 2004, 14 pages.
Reinhold, "The state of the module system", Accessed at http://openjdk.java.net/projects/jigsaw/spec/sotms/, Mar. 8, 2016, 27 pages.
Reinhold, "JEP 220: Modular run-time images", OpenJDK, Accessed at http://openjdk.java.net/jeps/220, Oct. 23, 2014, 9 pages.
Oracle, "Project Jigsaw", Accessed at http://openjdk.java.net/projects/jigsaw/, Mar. 24, 2016.
Oracle, "Java(Trademark) Platform, Standard Edition 9, API Specification", Accessed at http://cr.openjdk.java.net/~mr/jigsaw/spec/api/, 2015, 10 pages.
Oracle, "Class Data Sharing", Accessed at https://docs.oracle.com/javase/1.5.0/docs/guide/vm/class-data-sharing.html, 2015, 2 pages.
IBM Knowledge Center, "Class Data Sharing", IBM(Registered) SDK, Java (Trademark) Technology Edition, Version 7, Acccessed at https://www.ibm.com/support/knowledgecenter/SSYKE2_7.0.0/com.ibm.java.lnx.70.doc/diag/understanding/shared_classes.html, 2016.
Bateman et al., "JEP 261: Module System", Accessed at http://openjdk.java.net/jeps/261, Oct. 23, 2014, 14 pages.

(56) References Cited

OTHER PUBLICATIONS

Pawlak, Renaud. "Spoon: annotation-driven program transformation—the AOP case." Proceedings of the 1st workshop on Aspect oriented middleware development. ACM. (Year: 2005).
Erni, David, and Adrian Kuhn. "The Hacker's Guide to javac." University of Bern, Bachelor's thesis, supplementary documentation (Year: 2008).
Rodrigo Teixeira et al.; Does It Make Sense to Have Application-Specific Code Conventions as a Complementary Approach to Code Annotations; ACM; pp. 15-22; <https://dl.acm.org/citation.cfm?id=3281078>; retrieved on Mar. 15, 2019 (Year: 2018).
Phyllipe Lima et al.; An Annotation-Based API for Supporting Runtime Code Annotation Reading; ACM; pp. 6-14; <https://dl.acm.org/citation.cfm?id=3141856>; retrieved on Mar. 15, 2019 (Year: 2017).
Darren Lunn et al.; Combining SADIe and AxsJAX to Improve the Accessibility of Web Content; ACM; pp. 7578; <https://dl.acm.org/citation.cfm?id=1535672>; retrieved on Mar. 15, 2019 (Year: 2009).

\* cited by examiner

RESTRICTIVE ACCESS CONTROL FOR MODULAR REFLECTION

BENEFIT CLAIM; INCORPORATION BY REFERENCE

This application claims priority as a Continuation of U.S. Non-Provisional application Ser. No. 14/847,800 filed on Sep. 8, 2015 which claims benefit to U.S. Provisional Application No. 62/209,878 filed on Aug. 25, 2015, the content of both of which is hereby incorporated by reference.

TECHNICAL FIELD

The present disclosure relates to module systems. In particular, the present disclosure relates to restricting access to non-exposed module elements in a module system.

BACKGROUND

A module system permits the definition of a set of modules. Each module in a module system corresponds to a respective collection of code. A module system specifies how a collection of code corresponding to a particular module can access code corresponding to other modules. A module descriptor (interchangeably referred to as a "module interface"), for a particular module, expresses other modules upon which the particular module may depend. The declaration of a dependency on another module may be referred to as an explicit dependency. A module descriptor also expresses the elements of a particular module that are exposed by the particular module to the other modules which declare an explicit dependency on the particular module. Other modules which do not declare an explicit dependency on the particular module are restricted from accessing such elements.

Conventionally, module systems are designed to allow certain access techniques and/or accessibility configurations to override access restrictions declared in a module descriptor. In one example, reflective Application Programming Interfaces (APIs) (such as java.lang.reflect in Java SE) allow a test framework module to access a module element within a particular module even if that module element has not been exposed by the particular module to the test framework module. In another example, the .NET platform's reflective API allows for access to the internals of any module.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
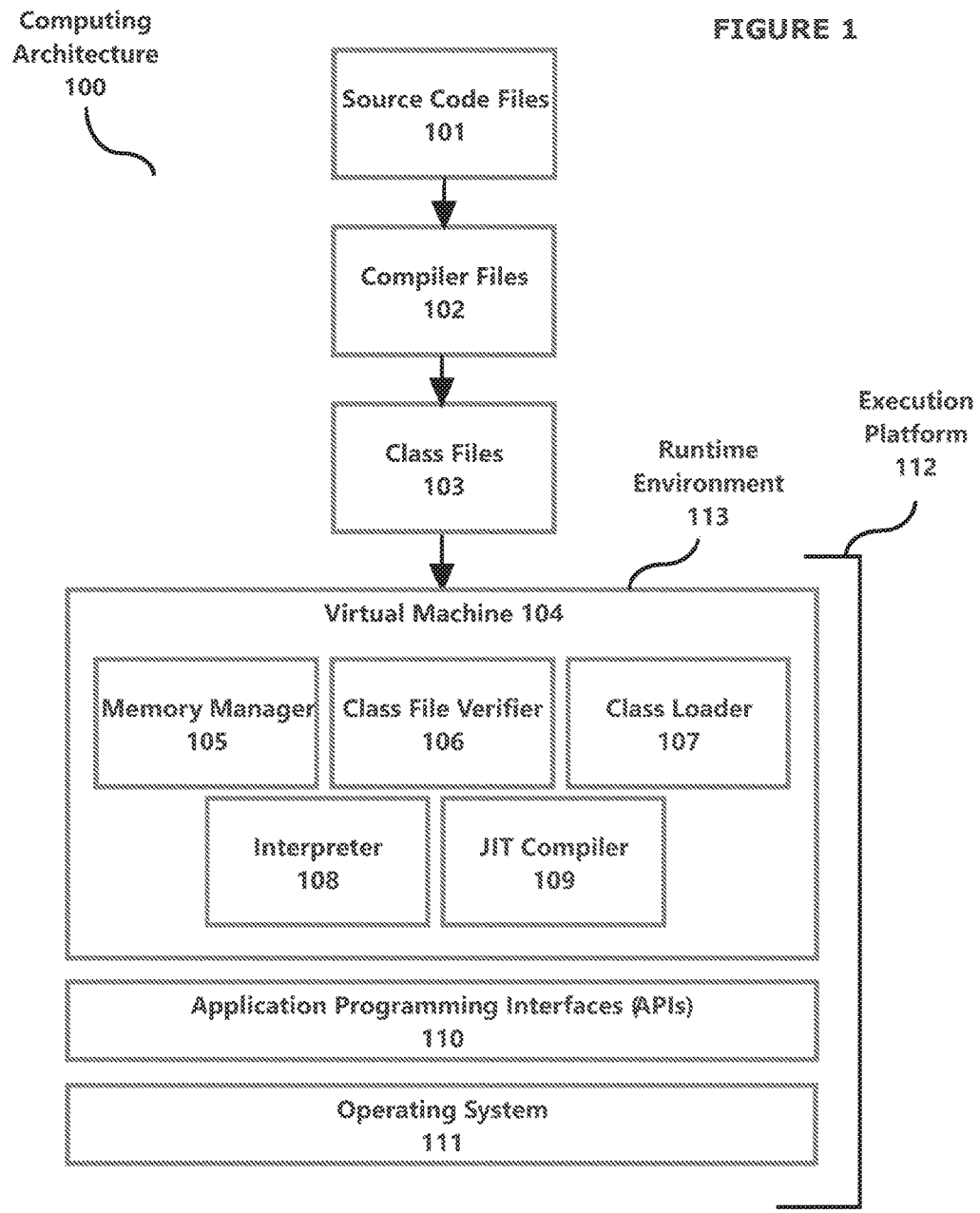
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview
2. Architectural Overview
   2.1 Example Class File Structure
   2.2 Example Virtual Machine Architecture
   2.3 Loading, Linking, and Initializing
3. Module Elements of a Module in a Module System
4. Access Kinds for Accessing Module Elements
5. Controlling Access to Module Elements
6. Miscellaneous; Extensions
7. Hardware Overview

1. General Overview

One or more embodiments include strictly controlling access to modules in a module system.

In one embodiment, access to a module element within a first module by a second module is strictly prohibited if the module element within the first module has not been exposed to the second module. Access to the non-exposed module element of the first module by the second module is strictly prohibited regardless of (a) whether the non-exposed module element has been declared with a public or non-public access modifier, (b) the level of access associated with the operation that attempts to access the non-exposed module element of the first module, and (c) whether an accessibility override configuration is set for the non-exposed module element. In an example, access by a consumer module to a non-exposed module element of a provider module is prohibited even when access is attempted using a reflective operation with an accessibility override configuration being set for attempting to access the non-exposed module element.

In an example, access to a non-exposed module element within a first module by a second module is strictly prohibited even when the access is attempted using reflective operations with an accessibility override configuration that sets the non-exposed module element to be publicly accessible.

In an embodiment, if a particular module element within a first module has been exposed to a second module, then access to the particular module element by the second module may or may not be allowed. Permissions for accessing the exposed particular module element may be determined based on one or more factors including, but not limited to: (a) whether the particular module element has been declared with a public or non-public access modifier, (b) whether a second exposed module element, which includes the particular module element, has been declared with a public or non-public access modifier, (c) the level of access associated with the operation that attempts to access the non-exposed module element of the first module, and (d) whether an accessibility override configuration is set for the non-exposed module element.

In an example, a module element, in a first module, is a field declaration with a non-public access modifier. The field declaration is within a class declaration with a public access modifier. Both the field declaration and the class declaration are exposed by way of exposing a package which includes the class declaration (and as a result, the field declaration). If a second module attempts to access the field declaration (with the non-public access modifier) using a reflective operation, access is allowed or prohibited based on whether or not the reflective operation sets an accessibility override configuration for the field declaration. If the accessibility override configuration is not set, the non-public access modifier in the field declaration dictates that the second module is prohibited from accessing the field declaration. If the accessibility override configuration is set, the non-public access modifier in the field declaration is overridden and the second module is allowed to access the field declaration.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be construed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 112 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpass a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 111. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
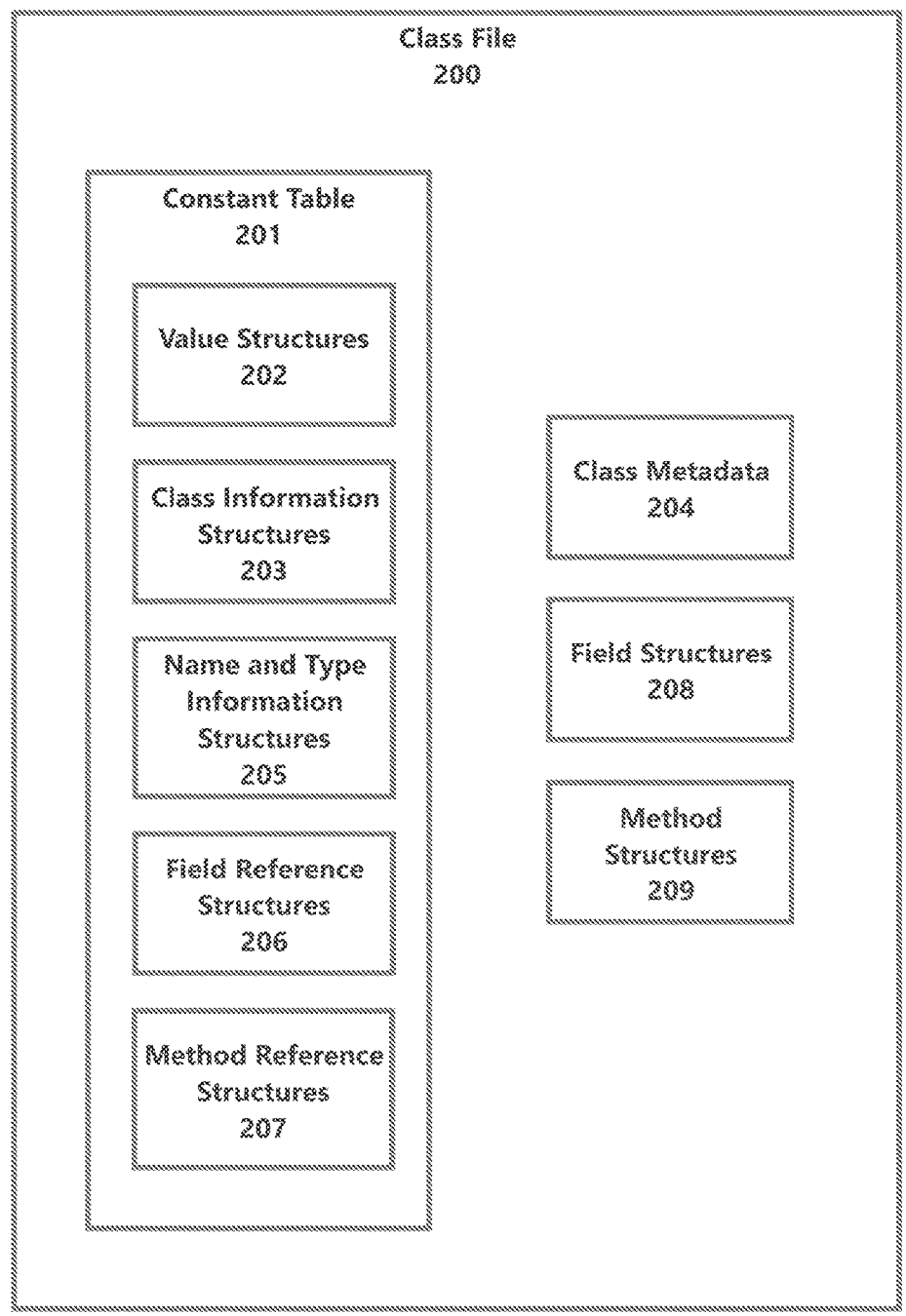
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 is made up of class members including, but not limited to, a constant table 201, field structures 208, class metadata 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, non-public, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, non-public, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, non-public, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m (int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
int add12and13( ) {
    return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 112. As will be described in Section 2.3, eventually the run-time representation of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
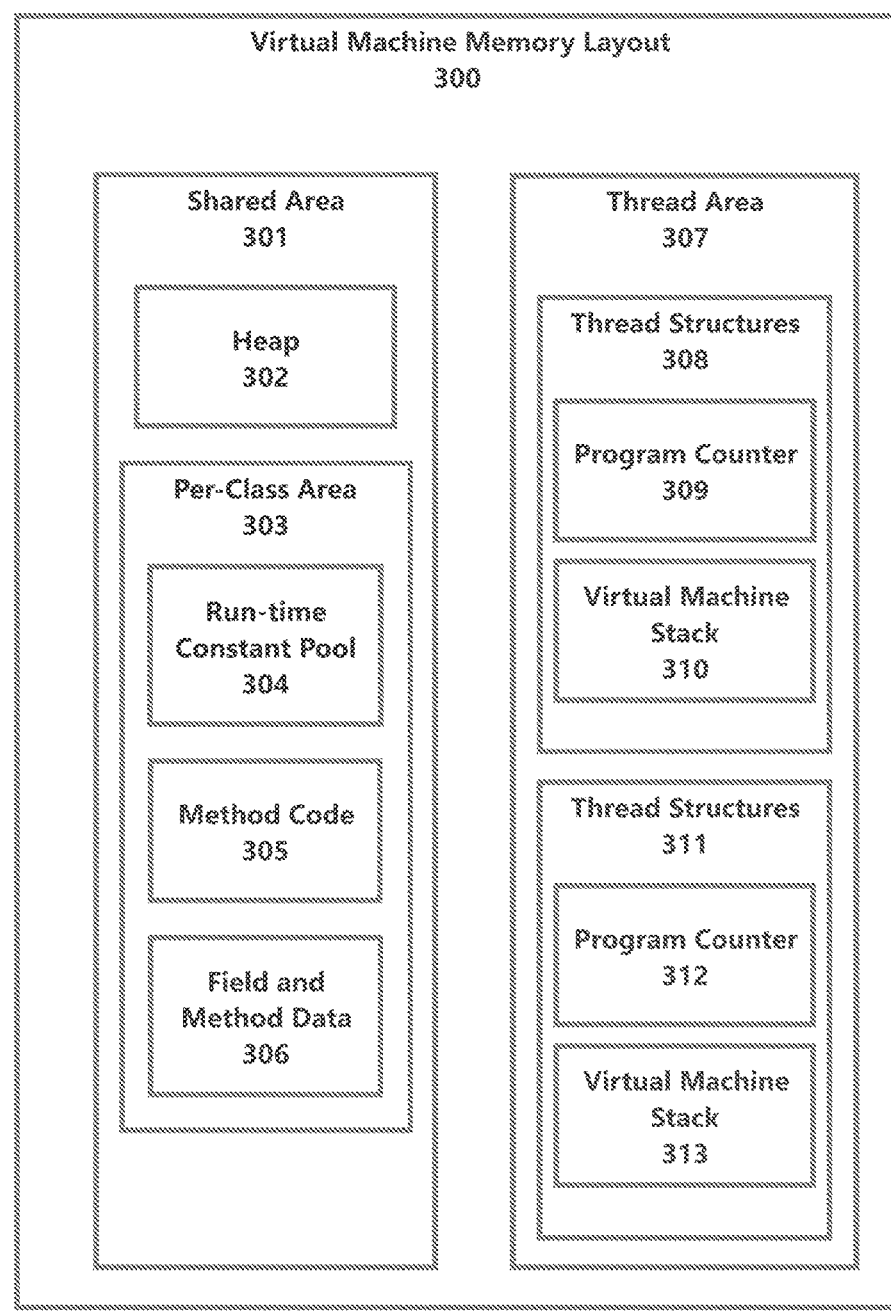
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 112. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the superclasses of the loaded class. For example, the virtual machine 104 may ensure that the superclasses of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Module Elements of a Module in a Module System

One or more embodiments are applicable to a module system. Each module within a module system corresponds to a respective set of code (referred to as "module code"). Each module is associated with one or more module elements. A module element, as referred to herein, corresponds to a portion of the module code. A module element (portion of module code) may itself include additional module elements (sub-portions of module code).

Module systems implemented in different programming languages may be defined with different types of module elements. Some examples, described herein, refer to the specific module elements of a module in a Java Module System for purposes of explanation. However, embodiments are equally applicable to module elements of different types in module systems implemented in other programming languages.

In the Java Module System, each module includes one or more packages. Each package includes one or more classes. Each class includes one or more class members such as fields and methods. Methods, as referred to herein, include constructors which may be invoked for the creation of an object by instantiating classes. A module element, as referred to herein with respect to the Java Module System, may include a package, a class, or a class member.

Exposing Module Elements

In an embodiment, a module element of a module may or may not be exposed to another module. In the Java Module System, a package may be exposed by a module when a module descriptor, corresponding to the module, includes an "exports" expression with the package identified as a parameter. The package may be exported to a set of specified modules (referred to as "qualified export") or to all other modules in the module system (referred to as "unqualified export").

The module element, of a provider module, may be exposed to a consumer module by the provider module if any of a set of conditions are met. The set of conditions may include, but are not limited to (a) a declaration within the descriptor of the provider module that exposes the module element to the consumer module via a qualified or unqualified export, (b) a user instruction received via an interface (e.g., a command line interface), (c) a determination by the run-time environment based on detection of a triggering event associated with permissions for exposing the module element, or (d) any other instruction that instructs a module system to expose the module element.

A particular module element may be exposed by exposing of the particular module element itself or by exposing another module element which includes the particular module element. In one example, a class may be exposed by exposing a package which includes the class. Class members of the class are also exposed by exposing of the package which includes the class.

One or more embodiments relate to accessing module elements of a module in a module system. The module attempting the access is referred to herein as a consumer module and the module being accessed is referred to herein as a provider module. A module may function as either a consumer module or provider module for different access operations.

In an embodiment, determining whether a module element of a provider module may be accessed by a consumer module is based, at least in part, on whether the module element in the provider module as been exposed to the consumer module. Access controls which determine whether a module element of a provider module can be accessed by a consumer module are further described in Section 5. "Controlling Access to Module Elements."

Access Modifiers for Module Elements

In an embodiment, a module element is declared with an access modifier. The access modifier identifies an accessibility configuration of the module element. The accessibility configuration declares that the module element is (a) publicly accessible or (b) not publicly accessible. In one example, the modifier "public" indicates that a module element is publicly accessible and the modifier "private" indicates that the module element is not publicly accessible. However, the declared access modifier does not by itself control whether the module element is accessible or inaccessible from outside of the module. Access controls which determine whether a module element of a provider module can be accessed by a consumer module are further described in Section 5. "Controlling Access to Module Elements."

4. Operations which May Require Accessing a Module Element of A Provider Module by a Consumer Module In an embodiment, different kinds of operations require access to a module element of a provider module by a consumer module.

Operations may be performed on byte code to enumerate, analyze, and/or categorize sections of the byte code. Some examples of operations for accessing module elements include reflection operations identified in the Java reflection API.

In an embodiment, an operation includes getting or setting a value of a module element where (a) the module element represents a field, (b) the getting or setting is performed with respect to an object, and (c) the object is an instance of another module element (e.g., a class which includes the field). An example set of operations include, but are not limited to:

(a) getField(String name): Returns a Field object that reflects the specified field of the class or interface represented by the Class object upon which the command is executed.

(b) getFields( ): Returns an array containing Field objects reflecting all the fields of the class or interface represented by the Class object upon which the command is executed.

(c) getDeclaredFields( ): Returns an array of Field objects reflecting all the fields declared by the class or interface represented by the Class object upon which the command is executed.

(d) getDeclaredMethods( ): Returns an array of Method objects reflecting all the methods declared by the class or interface represented by the Class object upon which the command is executed.

(e) getSuperclass( ): Returns the Class representing the superclass of the entity (class, interface, primitive type or void) represented by the Class upon which the command is executed.

(f) set(Object obj, Object value): Sets the value of the field represented by the Field object upon which the command is executed, on the specified object argument to the specified new value.

(g) get(Object obj): Returns the value of the field represented by the Field upon which the command is executed, on the specified object.

In an embodiment, an operation includes a consumer module invoking the module element of a provider module. Module elements which are methods may be invoked with or without reflection techniques. One example command for invoking a method using reflection includes java.lang.reflect.Method.invoke( ). The first argument is the object instance on which a particular method is to be invoked. If the method is static, the first argument may be null. Subsequent arguments are the method's parameters.

In an embodiment, an operation includes a consumer module instantiating the module element of a provider module. A class (first module element of provider module) may be instantiated by a consumer module by invoking a constructor (second module element of provider module) of the class.

In an example, a class Spaceship is a first module element in a provider module. The class Spaceship includes a second module element which is a method declaration fireMissile ( ). A separate class CommandCenter is a module element in a consumer module. The class CommandCenter (module element of consumer module) may include operations to (a) instantiate an object of type Spaceship (module element of provider module) and (b) invoke the method fireMissile( ) (module element of provider module) on the instance of SpaceShip from (a).

5. Controlling Access to Module Elements

As noted above, one or more operations require access to a module element of a provider module by a consumer module. One or more embodiments include controlling access to the module element of the provider module by the consumer module. Controlling access includes allowing access or prohibiting access. If access to the module element of the provider module by the consumer module is allowed, then the operation is successfully compiled or executed. If the access to the module element of the provider module by the consumer module is prohibited, then the operation may not successfully compile and/or may not successfully execute. Factors, as described herein, for controlling access to a particular type of module element may be applicable for controlling access to another type of module element.

Figure 4:
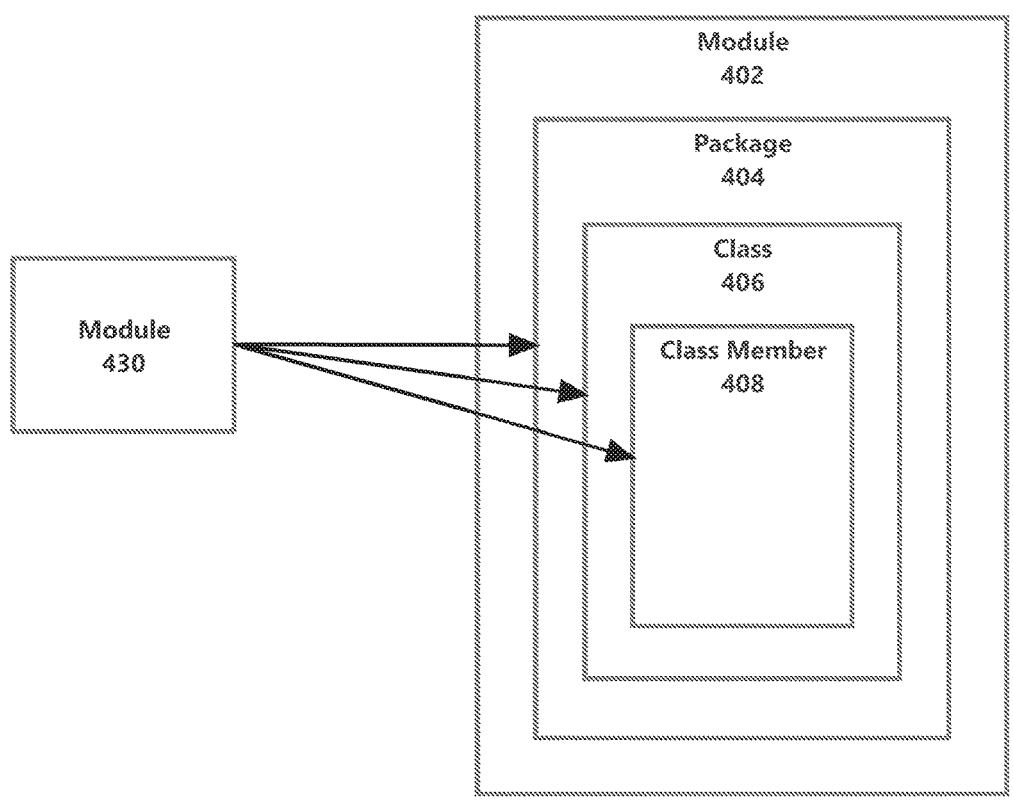
FIG. 4 illustrates an example of a module in the Java Module System in accordance with one or more embodiments.

FIG. 4 illustrates an example of a module in the Java Module System in accordance with one or more embodiments. Other modules (defined using the Java Module System or other module systems) may include more, less, and/or different module elements than illustrated in FIG. 4. A module (e.g., module 402) may include any number of packages. A package (e.g., package 404) may include any number of classes. A class (e.g., class 406) may include any number of class members (e.g., class member 408).

One or more embodiments include controlling access to module elements (i.e., package 404, class 406, or class member 408) of a provider module (e.g., module 402) by a consumer module (e.g., module 430). In order for module 430 to access class member 408 of module 402, module 430 may need access permissions to access (a) class member 408 itself, (b) class 406 which includes class member 408, and (c) package 404 which includes class 406. Furthermore, access controls applicable to a module element (e.g., class 406) may determine whether an operation that accesses an object, created by instantiating the module element, is allowed or prohibited. In an example, access to obtain or modify a value of field of an object is allowed or prohibited based on access controls for the particular class which is instantiated to create the object.

Figure 5:
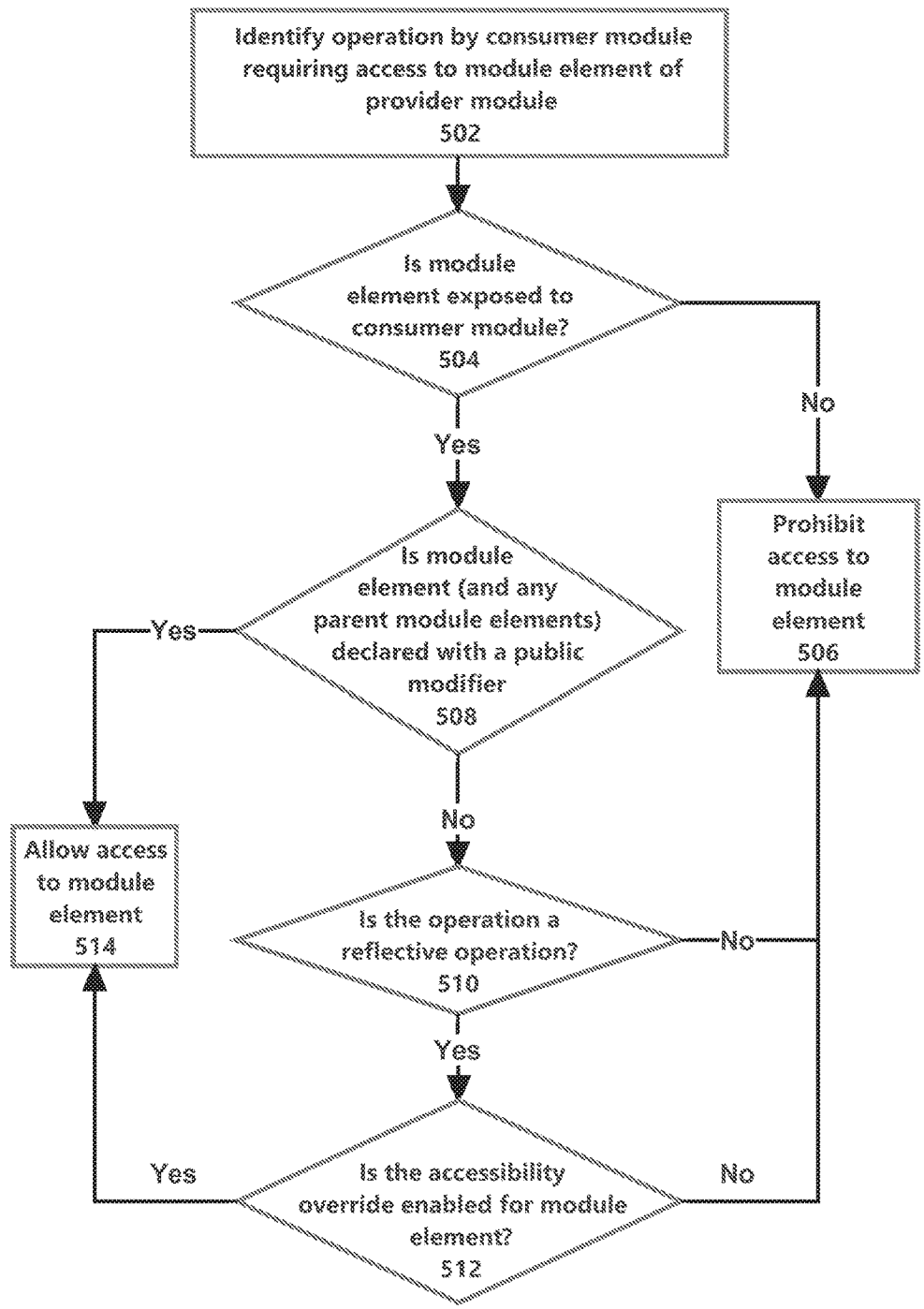
FIG. 5 illustrates operations in accordance with one or more embodiments.

FIG. 5 illustrates an example set of steps for allowing or prohibiting access to a module element of a provider module by a consumer module. Steps described below with reference to FIG. 5 may be performed prior to and/or during runtime. A compiler, interpreter, and/or runtime environment may perform one or more of the steps described below.

Initially, an operation by a consumer module that attempts to access a module element of a provider module is identified (Step 502). The operation may be identified by a compiler during a compilation process. The operation may be identified by the runtime environment when execution of the operation is requested. Some examples of kinds of operations which require access to a module element are indicated above in Section 4, titled "Operations which may require accessing a module element of a provider module by a consumer module."

Responsive to identifying an operation by a consumer module that attempts to access a module element of a provider module, a check is necessary to determine if the consumer module has the necessary permissions to access the module element of the provider module. The check is a multi-step process as described below.

In an embodiment, a determination is made whether the module element of the provider module has been exposed to the consumer module (Step 504). As noted above, a particular module element of a provider module may be exposed to the consumer module if either (a) the particular module element has itself been exposed to the consumer module or (b) if a second module element which includes the particular module element has been exposed to the consumer module. In the Java module system, if a package in a provider module has been exposed to a consumer module, then all of the classes within the package and the class members within the classes have been exposed to the consumer module. In the example illustrated in FIG. 4, exposing package 404 of module 402 to module 430 includes exposing class 406 and class 408 to module 430. Package 404 of module 402 may be exposed to module 430 with a qualified export which specifically identifies module 430. Package 404 of module 402 may be exposed to module 430 with an unqualified export to all modules in the module system (without specifically identifying module 430).

If the module element of the provider module has not been exposed to the consumer module, then the consumer module is strictly prohibited from accessing the module element of the provider module (Step 506). Access to the module element of the provider module by the consumer module is strictly prohibited regardless of (a) an access modifier in the module element declaration, (b) an accessibility override configuration expressed for the module element (described below), or (c) a level of access associated with the operation that attempts to access the module element (described below). Strictly prohibiting access may include generating a compile time error and/or runtime error (e.g., throwing an exception) which prevents execution of an operation that attempts to access the module element.

In the example illustrated in FIG. 4, if class member 408 has not been exposed to module 430, then access to class member 408 by module 430 is strictly prohibited. The strict prohibition to non-exposed class member 408 is applicable even if (a) class member 408 and class 406 are declared with public access modifiers (b) an accessibility override configuration is set to override any non-public access modifiers, and (c) the attempt to access class member 408 relies upon an operation with a highest possible level of access. Similarly, if class 406 has not been exposed to module 430, then access to class 406 by module 430 is strictly prohibited.

If a determination is made in Operation 504 that the module element of the provider module has been exposed to the consumer module, then access may or may not be allowed. In other words, exposing of the module element of the provider module to the consumer module does not guarantee that the consumer module is allowed to access the module element. Allowing or prohibiting access to the exposed module element of the provider module by the consumer module depends on a set of factors as described below.

In an embodiment, a determination is made whether the exposed module element is declared with a public access modifier (Step 508). The module element declaration may be examined to determine if a public access modifier or a non-public access modifier is configured for the exposed module element. Furthermore, if the exposed module element is included within another parent module element with an access modifier, then a check is performed to determine if the declaration of the parent module element includes a public access modifier or a non-public access modifier. For example, if the exposed module element is a class member of particular class, then the access modifier of each of the class member declaration and the class declaration are examined to determine if both include public access modifiers.

If the module element (and any parent module element with an access modifier) is (are) declared with a public access modifier, then access to the module element of the provider module by the consumer module is allowed (Step 514). Allowing access to the module element of the provider module by the consumer module allows for successful compilation and/or execution of the operation, which attempts to access the module element.

If the exposed module element (or if any parent module element of the module element) are declared with a non-public access modifier, then additional analysis is needed to determine if access to the exposed module element is to be allowed or prohibited. Access to the exposed module element with a non-public access modifier may depend on a level of access associated with the operation attempting access. FIG. 5 defines an operation, with a minimum level of access required to access an exposed module element with a non-public modifier, as a reflective operation with an accessibility override configuration set for the exposed module element (detailed below). However, other embodiments are equally applicable to any system in which different operations are associated with different levels of access. For example, a first operation (in a consumer module) with a first level of access is allowed to access a non-public class member of a public class in an exposed package of a provider module. However, the first operation with the first level of access is prohibited from accessing a non-public class member of a non-public class in the exposed package of the provider module. A second operation (in the same consumer module) with a second level of access (higher than the first level of access) is allowed to access the non-public class member of the non-public class in the exposed package of the provider module. Accordingly, the specific operations 510 and 512 of FIG. 5 described below should be understood as an example set of rules for determining access to an exposed module element with a non-public modifier. The specific operations 510 and 512 should not be construed as limiting the scope of other embodiments in which operations are defined with a different set of access levels.

Continuing with FIG. 5, in an embodiment, an exposed module element with a non-public access modifier may be accessible if (a) the operation is a reflective operation (Step 510) and (b) an accessibility override configuration is set for the exposed module element being accessed (Step 512). Accordingly, if the operation is a reflective operation with an accessibility override configuration set for the module element being accessed, then access to the module element is allowed (Step 514). In an embodiment, an accessibility override configuration is available to a consumer module for accessing a module element of a provider module. The accessibility override configuration may be available to the consumer module independent of any configuration for the provider module even though the accessibility override configuration is being set to access the module element of the provider module.

In an example, a reflective operation (from the Java reflection API) includes get(Object obj) which returns the value of the field represented by the Field (on which the command is executed), on the specified object. The reflective operation further includes setAccessible( ) which sets the accessibility override configuration for the exposed module element with a non-public modifier. The reflective operation with the accessibility override configuration is allowed to access the exposed module element with a non-public modifier. The exposed module element being an element of a provider module which is being accessed by a consumer module.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
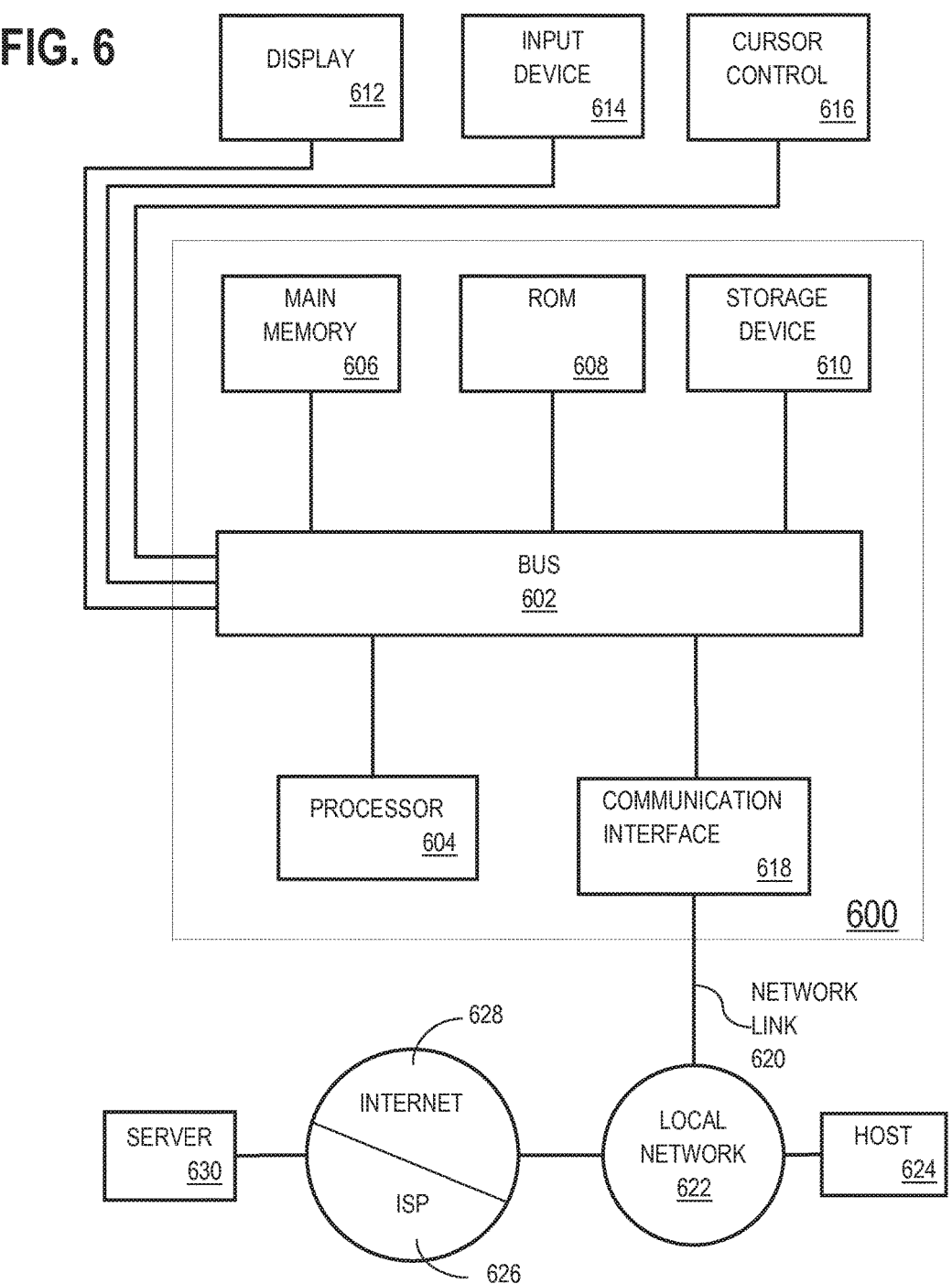
FIG. 6 illustrates a system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another kind of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding kind of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of steps comprising:
   identifying an operation, expressed in a first module, wherein execution of the operation requires access to a module element of a second module;
   wherein, in absence of any modular boundary associated with the module element, a non-module-specific accessibility configuration associated with the module element controls the access to the module element;
   wherein, if a module boundary associated with the module element is present, the non-module-specific accessibility configuration associated with the module element controls the access to the module element if the module boundary associated with the module element permits the access to the module element;
   determining that the operation is associated with a highest possible level of non-module-specific access;
   determining whether the module element is exposed by the second module to the first module based on the module boundary associated with the module element;
   responsive to determining that the module element is not exposed by the second module to the first module based on the module boundary associated with the module element: prohibiting the operation.

2. The medium of claim 1, wherein a compiler enforces control of the access to the module element based on (a) any modular boundary associated with the module element and (b) the non-module-specific accessibility configuration associated with the module element.

3. The medium of claim 1, wherein a run-time environment enforces control of the access to the module element based on (a) any modular boundary associated with the module element and (b) the non-module-specific accessibility configuration associated with the module element.

4. The medium of claim 1, wherein the prohibiting step comprises: refraining from compiling a set of code that includes the first module and the second module.

5. The medium of claim 1, wherein the prohibiting step comprises: refraining from executing the operation.

6. The medium of claim 1, wherein the prohibiting step comprises: generating a compile-time error associated with the operation.

7. The medium of claim 1, wherein the prohibiting step comprises: generating a run-time error associated with the operation.

8. The medium of claim 1, wherein the steps further comprise:
   responsive to determining that the module element is exposed by the second module to the first module based on the module boundary associated with the module element: allowing the operation.

9. The medium of claim 1, wherein the module element is associated with an accessibility override configuration.

10. The medium of claim 1, wherein the module element is associated with a public modifier.

11. The medium of claim 1, wherein determining whether the module element is exposed by the second module to the first module based on the module boundary associated with the module element comprises: determining whether a declaration within a module descriptor associated with the second module exposes the module element to the first module.

12. The medium of claim 1, wherein access to the module element is controlled based at least on a module descriptor associated with the second module.

13. The medium of claim 1, wherein determining whether the module element is exposed by the second module to the first module based on the module boundary associated with the module element comprises: determining whether a user instruction received via an interface exposes the module element to the first module.

14. The medium of claim 1, wherein determining whether the module element is exposed by the second module to the first module based on the module boundary associated with the module element comprises: determining whether a triggering event during run-time causes the module element to be exposed to the first module.

15. A non-transitory computer readable medium comprising instructions which, when executed by one or more hardware processors, cause performance of steps comprising:
   identifying an operation, expressed in a first module, wherein execution of the operation requires access to a module element of a second module, and wherein access to the module element is controlled by (a) a modular exposure of the module element and (b) a non-modular accessibility configuration associated with the module element;
   determining that the operation is associated with a particular level of non-modular access that permits access to the module element based on the non-modular accessibility configuration associated with the module element, if access to the module element is permitted based on the modular exposure of the module element;

determining whether the module element is exposed by the second module to the first module based on the modular exposure of the module element;

responsive to determining that the module element is not exposed by the second module to the first module based on the modular exposure of the module element: prohibiting the operation.

16. The medium of claim 15, wherein a compiler enforces control of the access to the module element based on (a) the modular exposure of the module element and (b) the non-modular accessibility configuration associated with the module element.

17. The medium of claim 15, wherein a run-time environment enforces control of the access to the module element based on (a) the modular exposure of the module element and (b) the non-modular accessibility configuration associated with the module element.

18. The medium of claim 15, wherein the prohibiting step comprises: refraining from compiling a set of code that includes the first module and the second module.

19. The medium of claim 15, wherein the prohibiting step comprises: refraining from executing the operation.

20. The medium of claim 15, wherein the steps further comprise:

responsive to determining that the module element is exposed by the second module to the first module based on the modular exposure of the module element: allowing the operation.

21. The medium of claim 15, wherein the operation is a reflective operation.

22. A system, comprising:

at least one device including a hardware processor; and the system being configured to perform steps comprising:

identifying an operation, expressed in a first module, wherein execution of the operation requires access to a module element of a second module, and wherein access to the module element is controlled by (a) a modular exposure of the module element and (b) a non-modular accessibility configuration associated with the module element;

determining that the operation is associated with a particular level of non-modular access that permits access to the module element based on the non-modular accessibility configuration associated with the module element, if access to the module element is permitted based on the modular exposure of the module element;

determining whether the module element is exposed by the second module to the first module based on the modular exposure of the module element;

responsive to determining that the module element is not exposed by the second module to the first module based on the modular exposure of the module element: prohibiting the operation.

* * * * *

UNITED STATES PATENT AND TRADEMARK OFFICE
CERTIFICATE OF CORRECTION

PATENT NO. : 10,367,822 B2
APPLICATION NO. : 16/110670
DATED : July 30, 2019
INVENTOR(S) : Buckley et al.

It is certified that error appears in the above-identified patent and that said Letters Patent is hereby corrected as shown below:

On the Title Page

On page 3, Column 2, item (56) under Other Publications, Line 3, delete "lterable." and insert -- Iterable. --, therefor.

In the Specification

In Column 7, Line 53, delete "add12andl3" and insert -- add12and13 --, therefor.

In Column 12, Line 22, delete "as been" and insert -- has been --, therefor.

Signed and Sealed this
Twenty-eighth Day of July, 2020

Andrei Iancu
*Director of the United States Patent and Trademark Office*